United States Patent [19]

Müller et al.

[11] Patent Number: 4,515,445
[45] Date of Patent: May 7, 1985

[54] OPTICAL SYSTEM FOR TRANSMITTED-LIGHT MICROSCOPY WITH INCIDENT ILLUMINATION

[75] Inventors: Gerhard Müller, Aalen; Jürgen Schwarz, Oberkochen, both of Fed. Rep. of Germany

[73] Assignee: Carl-Zeiss-Stiftung, Heidenheim/Brenz, Oberkochen, Fed. Rep. of Germany

[21] Appl. No.: 460,036

[22] Filed: Jan. 21, 1983

[30] Foreign Application Priority Data

Feb. 11, 1982 [DE] Fed. Rep. of Germany ....... 3204686

[51] Int. Cl.³ .............................................. G02B 21/06
[52] U.S. Cl. .................................... 350/524; 350/523; 350/527
[58] Field of Search ................. 350/523–528, 350/502, 508–510, 520; 354/79

[56] References Cited

U.S. PATENT DOCUMENTS 2,601,175  6/1952  Smith .................................. 350/510
2,944,463  7/1960  Räntsch ............................... 350/524
4,113,344  9/1978  Shoemaker .......................... 350/523

FOREIGN PATENT DOCUMENTS 1263339  3/1968  Fed. Rep. of Germany ...... 350/526
2546079  5/1977  Fed. Rep. of Germany .
1304134  8/1962  France ................................. 350/527
 198007  6/1967  U.S.S.R. ............................... 350/527

Primary Examiner—William H. Punter
Attorney, Agent, or Firm—Hopgood, Calimafde, Kalil, Blaustein & Judlowe

[57] ABSTRACT

A retroreflection device is mounted beneath a transmitted-light specimen observed through a reflected-light microscope. The retroreflection device is in the form of an autocollimation system consisting of two high-aperture objectives and a flat mirror. The objectives image the specimen and the mirror one onto the other so that the specimen is further illuminated by its own coincident intermediate image. When making photometric measurements, the double passage of light through the specimen achieves an improvement in contrast as well as an increase in extinction values.

8 Claims, 3 Drawing Figures

OPTICAL SYSTEM FOR TRANSMITTED-LIGHT MICROSCOPY WITH INCIDENT ILLUMINATION

BACKGROUND OF THE INVENTION

In microscopy, it is frequently desired to be able, without major conversion, to use an available reflected-light microscope for the purpose of observing light-transmitting objects. This desire is particularly great in the field of microphotometry where the transfer from reflected-light photometry to transmitted-light photometry involves major conversion and adjustment tasks. Thus, as a rule, the installed monochromator which serves the illumination-beam path must be converted, or a second monochromator must be provided.

In microscopy on light-transmitting objects, a known optical system is provided with a retroreflection device for light emanating from an incident-light illuminating device and transmitted by the object, the light being reflected back onto the rear side of the object. The present invention relates to such a system, as described, for example, in British Pat. No. 784,822. To retroreflect the light transmitted by the object, the known device has a multi-tetrahedral mirror, located below the object, to depolarize polarized light from the incident-light illuminating device. A transmitted-light image of the object illuminated with incident illumination is obtained, by using a crossed-polarization analyzer in the path of the observation beam, thereby permitting through-passage of only the depolarized portion of light coming from the tetrahedral mirror.

The known device, however, gives a relatively dark, low-contrast image, and it is not suitable for photometric measurements.

From West German published patent application OS No. 2,546,079, a reflecting condenser for microscopes is known to employ two spherical or aspherical annular mirrors to reflect the rays of an incident-light brightfield illumination, the object-reflected rays being transmitted back as transmitted-light dark-field illumination onto the object. Such a device is admittedly suitable for incident-light fluorescence microscopy but not for transmitted-light photometry.

BRIEF STATEMENT OF THE INVENTION

The object of the present invention is to provide an optical system of the aforementioned type for microscopy on light-transmitting objects, wherein the optical system is also particularly suited for photometric measurements in transmitted light.

This object is achieved in an optical system having a retroreflection device by which light from an incident-light illuminating source and transmitted by the object is so reflected back onto the rear side of the object that the object is imaged upon itself, unreversed and erect.

The construction of the retroreflection device of the invention assures that light rays which pass through the object pass through the same object points in both directions. In this way, an increase in contrast is obtained; and, in making photometric measurements, a doubling of the extinction values is achieved, as compared with such measurements using traditional simple transmitted-light illumination. This doubling is particularly advantageous when making photometric measurements on weakly absorbing objects.

A very simple construction results by using autocollimation in the retroreflection system, the autocollimation part of the system being arranged below (or, in the case of inverted microscopes, above) the specimen. The autocollimating part has an optical system which images the rest of the object onto a flat mirror and then images the resultant image back onto the bottom of the object. To avoid aperture loss, this autocollimation system may, for example, comprise two objectives of infinite exit back-focus, object plane and the surface of the flat mirror being at the respective focal points of these objectives. The mirror is advisedly cemented directly onto its associated objective and forms therewith a single structural unit.

For microphotography, it is advantageous to develop the flat mirror of the autocollimation optical system as a partially transmitting mirror via which any desired additional information can be introduced into the microscope image.

It is further advantageous for the flat mirror to be so mounted that it can be inclined with respect to the optical axis of the system. This permits the autocollimation ray path to be decentered by a small angle so that the pupil for the retroreflected image will be unilaterally intersected, thereby unilaterally degrading transmission transfers, as for example at the object/surrounding boundaries. This technique produces a three-dimensional effect, of the kind which is also obtained for unilaterally oblique illumination of an object.

DETAILED DESCRIPTION

The invention will be illustratively described in detail, in conjunction with the accompanying drawings, in which.

Figure 1:
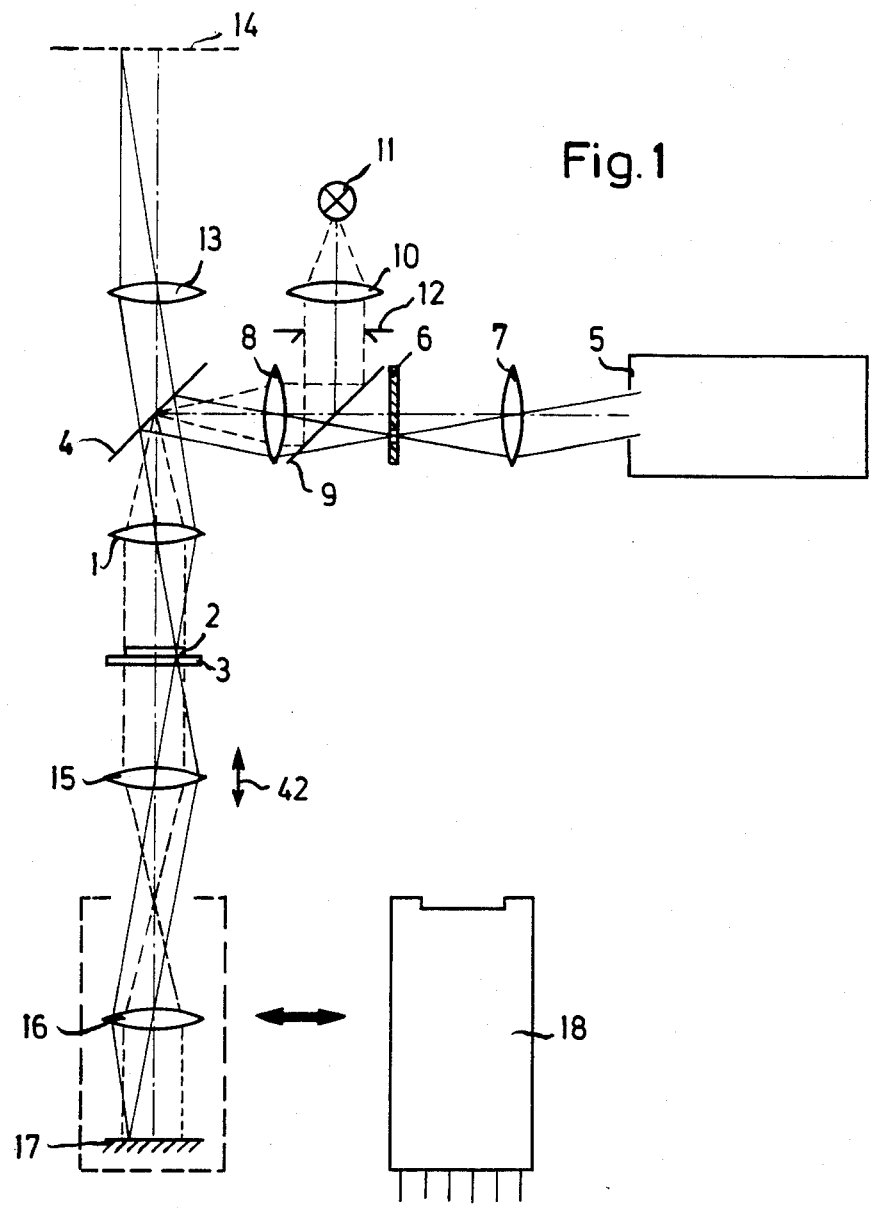
FIG. 1 is an optical diagram showing the construction of a microscope photometer incorporating a retroreflection device of the invention.

For measurement purposes, the microscope photometer of FIG. 1 relies upon light from a monochromator 5, applied via a partially transmitting mirror 4 and an objective 1 to a specimen on a slide 3, shown protected by a cover glass 2. A measurement diaphragm 6 is illuminated by a lens 7 and is imaged by a lens 8 and objective 1 into the object plane, as a diffraction-limited spot.

Auxiliary light to illuminate the surrounding field of the object is provided by an auxiliary illuminating device, comprising a lamp 11 and a collecting optical system 10; the auxiliary light is reflected onto the optical axis via a second partially transmitting mirror 9, shown between diaphragm 6 and lens 8, and field illumination is limited by a field diaphragm 12. The auxiliary illuminating device is disconnected when making the actual photometric measurement.

In the observation-ray path, a tube lens 13 produces an intermediate image 14 of the surface of the specimen, and it will be understood that the observation-ray path may be extended as via additional splitters or swingout mirrors (not shown), to present light from the object plane to a binocular tube and to a photomultiplier.

The described components 1 to 14 correspond to a photometric arrangement for incident light, in accordance with traditional construction.

However, the microscope photometer of FIG. 1 includes further components below the specimen, namely, an autocollimation system consisting of two objectives 15 and 16 and a flat mirror 17, the surface of mirror 17 being positioned at the image of the object plane. Thus, the object is passed twice through objectives 15 and 16, and an interim image, coincident with the object, is produced in the object plane. One thus obtains an increase in the extinction values, with advantageous effect on the measurement, particularly for the case of specimens which are weakly absorbent.

The objective 16 and the mirror 17 are combined into a single structural unit which can be swung out of the ray path and replaced by a photoelectric receiver (photomultiplier 18). This is advantageous in the photometry of objects of very strong absorbance, as when the double passage of light through the specimen, together with reduced intensity attributable to the splitting mirror 4, would cause signal level to drop below the threshold of detectability. The construction involving photometer 18 corresponds to an arrangement known as a so-called "inverted photometer". It has the advantage of greater sensitivity over traditional transmitted-light photometry in which the object is illuminated over an entire illuminated field of small aperture, since there is no stray light from object points not used for the measurement. This advantage is present even after swinging the retroreflection device into the ray path.

Figure 2:
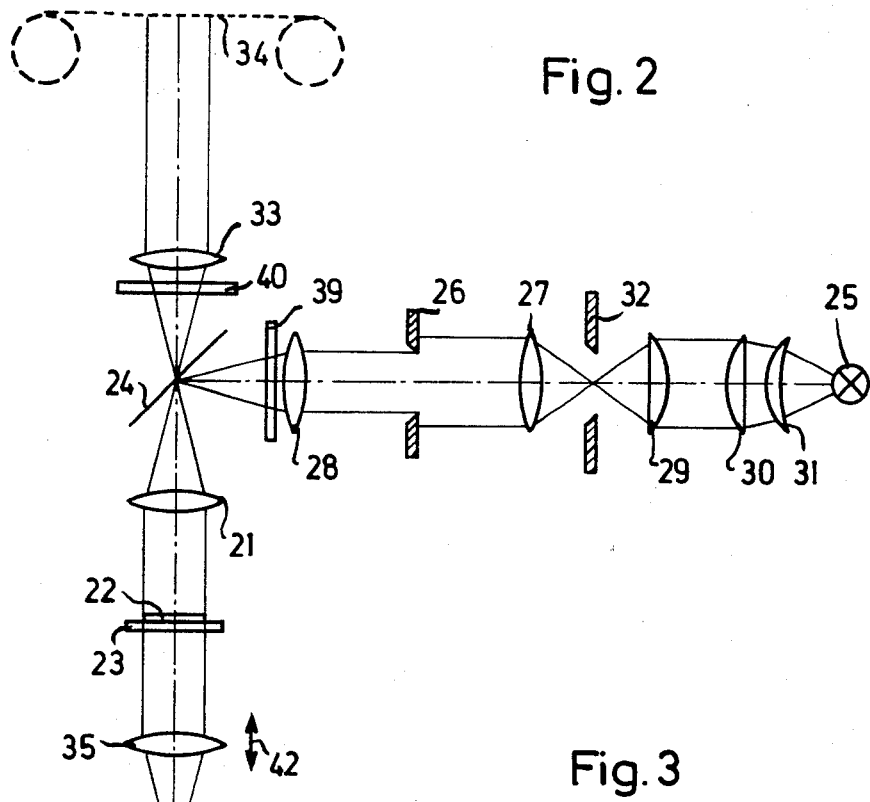
FIG. 2 is a similar diagram for the case of a photomicroscope incorporating a retroreflection device of the invention.

For components above its specimen slide 23, the microphotographic device of FIG. 2 corresponds to a traditional reflected-light microscope. These components comprise a light source 25, collector system 30/31, an optical system 29 for forming an intermediate image of the light source in the plane of an aperture diaphragm 32, an optical system 27/28 for illuminating the object plane or for imaging the field diaphragm 26 in the object plane, a splitting mirror 24, an objective 21 and a tube lens 33. The intermediate image plane 34 is imaged by other optical systems and beam splitters (not shown), for example, into a binocular tube and/or onto the film plane of a camera, which for purposes of simplification is shown in FIG. 2 to receive direct imaging of the object in the intermediate image plane 34.

In addition, in order to suppress reflections, a polarizer 39 is arranged in the illuminating-ray path, and an analyzer 40, which is cross-polarized with respect to polarizer 39, is arranged in the observation-ray path.

Below the specimen slide 23, there is a retroreflection device corresponding to that described for FIG. 1, consisting of two objectives 35 and 36 of infinite exit back-focus and a flat mirror 37, which is formed by the mirrored rear side of a so-called λ/4-plate 38, the axis of which is oriented 45° with respect to the direction of polarization. Upon two passes through this λ/4-plate 38, the direction of polarization is rotated in known manner by 90°, so that light which has passed through the object can pass through analyzer 40, while also removing disturbing reflections from the elements 21, 22, 23, 35 and 36.

Furthermore, in its position between objective 36 and mirror 37, the λ/4-plate 38 has a rectifying effect. Thus, if plate 38 is oriented with its axis parallel to the direction of polarization, polarization microscopy can be performed in the favorable circumstance of azimuth-dependent rotation of the polarized direction being partially compensated in the optical elements 21, 35 and 36.

Figure 3:
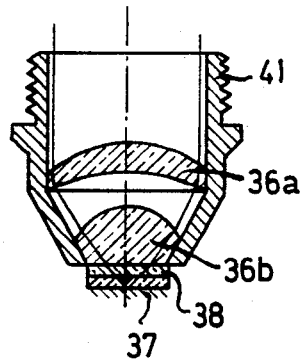
FIG. 3 is an enlarged longitudinal sectional view of a part of the retroreflection device of FIG. 2.

In FIG. 3, the λ/4-plate 38, the mirror 37 and the objective are shown to form a single structural unit 41. Plate 38 is cemented directly onto the front lens of an immersion objective of short focal length. Thus, there is assurance that the mirror layer 37 will always be at the focus of the objective. Adjustment of the retroreflection device with respect to sharp imaging of the object on itself is effected solely by displacing objective 35 in the direction indicated by the arrow 42.

In addition, the structural unit 41 can be inclined at small angles with respect to the optical axis, whereby a unilateral degradation of transmission transfers occurs in the retroreflected image. For the observer, a three-dimensional effect results upon superposing the two images; the observed effect is similar to that which results from unilaterally oblique illumination.

Other known methods of contrast enhancement, such as phase contrast and differential-interference contrast, can also be used without difficulty, in combination with the described retroreflection device. In this connection, corresponding diaphragms or Wollaston prisms can be arranged in the same way as for pure incident-light observation. A combination of a phase-contrast image is obtained (for the case of a pure transmitted-light image) if the phase rings in the rear focal plane of objective 35 are arranged in the retroreflection device.

What is claimed is:

1. An optical system for microscopy on light-transmitting objects having a retroreflection device by which the light coming from an incident-light illuminating device and transmitted by the object is reflected back onto the rear side of the object, characterized by the fact that the retroreflection device contains an optical system (15–17; 35–37) which images the object, unreversed and upright, on itself, and further characterized by the fact that the optical system comprises at least one objective arranged between the object (3) and a flat mirror (17), said objective imaging the object and the mirror one on the other.

2. An optical system according to claim 1, characterized by the fact that the optical system consists of two objectives (15, 16; 35, 36) which have an exit back-focus of infinity.

3. An optical system according to claim 2, characterized by the fact that the flat mirror (37) is placed on the front lens (36b) of the second objective (36).

4. An optical system according to claim 1, characterized by the fact that the second objective (16) can be swung, together with the mirror (17), out of the path of the beam.

5. An optical system according to claim 2, characterized by the fact that a λ/4-plate (38) is arranged between the flat mirror (37) and the second objective (36).

6. An optical system according to claim 1, characterized by the fact that the flat mirror (37) can be inclined at a small angle with respect to the optical axis.

7. An optical system according to claim 1, characterized by its use for transmitted-light microphotometry.

8. An optical system for microscopy on light-transmitting objects, comprising a microscope with means for incident-light illumination of one side of light-transmitting object in an object plane, and retroreflection means on the other side of said plane and positioned to receive light transmitted by the object and to reflect back onto the rear side of the object an image of the object, unreversed and upright, said retroreflection means including a flat mirror and two objectives (15, 16; 35, 36) having an exit back-focus of infinity, said objectives imaging the object and the mirror one upon the other.

* * * * *